United States Patent [19]

Wakatsuki et al.

[11] Patent Number: 4,967,598
[45] Date of Patent: Nov. 6, 1990

[54] ACCELERATION SENSOR

[75] Inventors: Noboru Wakatsuki, Kawasaki; Shigemi Kurashima, Kawasaki; Nobuyoshi Shimizu, Yokohama; Michiko Endoh, Yokohama; Akira Tanaka, Kawasaki, all of Japan

[73] Assignee: Fujitsu Limited, Kawasaki, Japan

[21] Appl. No.: 233,428

[22] Filed: Aug. 18, 1988

[30] Foreign Application Priority Data

Aug. 18, 1987 [JP] Japan .................. 62-204381
May 7, 1988 [JP] Japan .................. 63-110882

[51] Int. Cl.⁵ .............................. G01P 15/08
[52] U.S. Cl. ........................ 73/517 R; 73/DIG. 3
[58] Field of Search ................. 73/517 R, DIG. 3; 324/208; 360/113; 338/32 H

[56] References Cited

U.S. PATENT DOCUMENTS

| | | | |
|---|---|---|---|
| 3,867,844 | 2/1975 | Shimizu et al. | 73/517 R |
| 3,935,643 | 2/1976 | Russell et al. | 73/517 R |
| 3,961,185 | 6/1976 | Brokenshire et al. | 73/517 R |
| 4,365,513 | 12/1982 | Iwasaki | 73/517 R |
| 4,403,515 | 9/1983 | Iwasaki | 73/517 R |
| 4,498,341 | 2/1985 | Breitbach et al. | 73/517 R |
| 4,561,299 | 12/1985 | Orlando et al. | 73/517 R |
| 4,653,326 | 3/1987 | Danel et al. | 73/517 R |
| 4,736,629 | 4/1988 | Cole | 73/517 R |
| 4,810,965 | 3/1989 | Fujiwara et al. | 324/208 |

FOREIGN PATENT DOCUMENTS 3016001 10/1981 Fed. Rep. of Germany .... 73/517 R

Primary Examiner—John Chapman
Attorney, Agent, or Firm—Staas & Halsey

[57] ABSTRACT

An acceleration sensor including a cantilever beam having a free end to which a permanent magnet is attached. A pair of magnetic sensors, each comprising a barber-pole type magnetoresistive sensing element, is arranged in symmetrically spaced and opposed relationship and in a common plane extending parallel to the magnetic flux of the permanent magnet with respect to respective, opposite sides of the magnet. The cantilever is bent and the magnet is moved accordingly in response to an acceleration force, which is detected as outputs from the magnetoresistive sensing elements.

13 Claims, 12 Drawing Sheets

Fig. 3
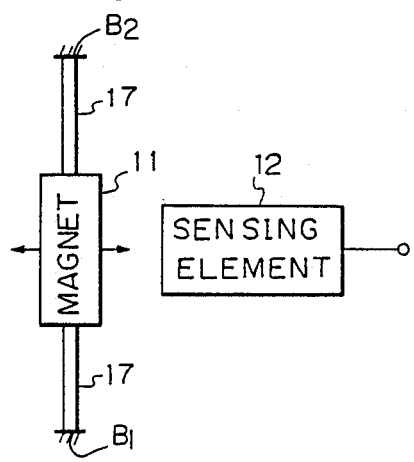
Fig. 4A
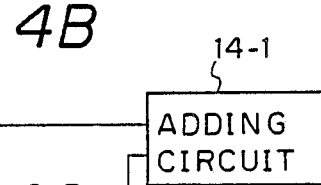
Fig. 4B
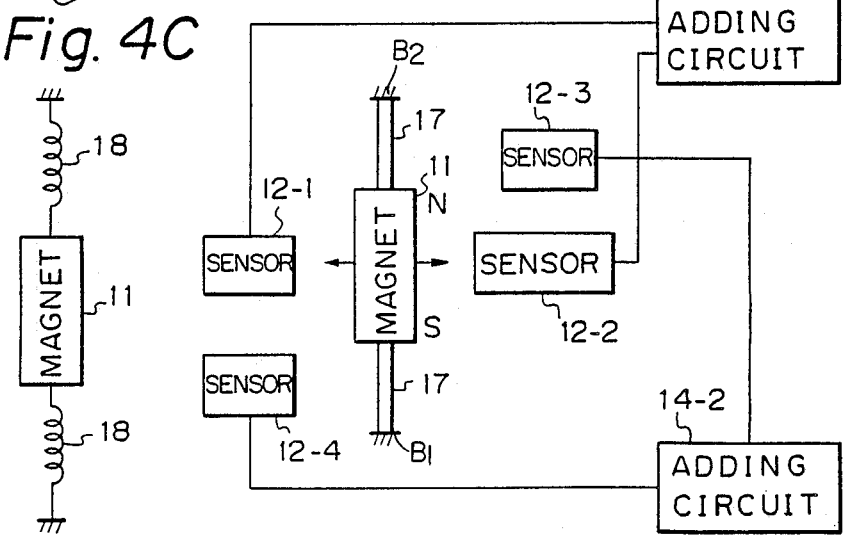
Fig. 4C

ACCELERATION SENSOR

BACKGROUND OF THE INVENTION

1. Field of the invention

This invention relates to an acceleration sensor and, more particularly, to a sensor for magnetically detecting an acceleration using a permanent magnet supported by a beam or deformable member which is deformed in accordance with the acceleration exerted thereon.

2. Description of the Related Art

An acceleration sensor having a beam which is bendable or deformable according to an acceleration exerted thereon is known. One of such known sensors comprises a cantilever beam having one end fixed to a base, a weight rigidly secured to the other end of the beam, an electrode attached to the base at the same level as the weight, and another electrode fixed on the base. The weight is moved and the beam is bent in accordance with an acceleration exerted on the weight. Therefore, the distance, i.e., the static electrical capacity between the two electrodes, is changed and, therefore, a value of acceleration according to the change can be detected. Alternatively, a direct current electrical resistance between the two electrodes can be measured to determine a value of acceleration.

This type of known acceleration sensor, however, can only be used when the direction of acceleration is constant and when the capacity change is relatively large, since it is relatively difficult to detect the change in the static electrical capacity between the two electrodes.

Another known acceleration sensor also includes a cantilever beam bendable in accordance with an acceleration and a strain gauge mounted on the beam, so that a strain of the cantilever, i.e., a change in the electrical resistance of the strain gauge, corresponding to a value of acceleration exerted on a weight attached to a free end of the cantilever is detected. The cantilever may be made of a silicon substrate.

Assuming that an acceleration is now exerted in a direction in which the beam is bent and the weight having a mass (m) is subjected to a force, $F = m\alpha$. In this case, a value of the electrical resistance will be represented as follows, on the basis of a stress T.

$$|\Delta\rho| = |\rho|\pi|T|$$

Where, $\Delta\rho$: change of specific resistance due to stress
$\rho$: specific resistance without strain
$\pi$: piezo resistance coefficient A semiconductor acceleration sensor is used to detect a value of acceleration on the basis of the change in this resistance.

In this type of known acceleration sensor, however, the cantilever beam possibly may be bent in other directions or torsioned according to the direction of an acceleration. In this case, an accurate detection of a value of acceleration in a particular direction, cannot be obtained.

SUMMARY OF THE INVENTION

An object of the present invention is to provide an acceleration sensor having a simple construction including a combination of one or more magnetoresistive sensors and a permanent magnet, and capable of stably detecting a value of an acceleration.

Another object of the present invention is to provide an acceleration sensor capable of overcoming the disadvantages mentioned above with reference to the prior art.

According the present invention, there is provided an acceleration sensor comprising: a base; a deformable member having at least one first portion rigidly secured to said base and a second portion separate from said first portion, said member being made of a material such that said second portion is moved by a certain distance from an initial position thereof when said member is deformed according to an acceleration exerted thereon, and returns to said initial position when an acceleration is not exerted thereon; one of a permanent magnet and a magnetic sensor comprising a magnetoresistive sensing element being attached to said deformable member at said second portion; the other of said permanent magnet and magnetic sensor being stationarily mounted on said base opposite to said one of a permanent magnet and a magnetic sensor and substantially on a line of direction along which said one of a permanent magnet and a magnetic sensor is moved; and an electrical circuit for detecting the acceleration according to an output from said magnetic sensor.

In another aspect of the present invention, there is provided an acceleration sensor comprising: a base; a deformable member having at least one first portion rigidly secured to said base and a second portion separate from said first portion, said member being made of a material such that said second portion is moved by a certain distance from an initial position thereof when said member is deformed according to an acceleration exerted thereon and returned to said initial position when an acceleration is not exerted thereon; a permanent magnet attached to said deformable member at said second portion; at least a pair of magnetic sensors, each comprising a magnetoresistive sensing element, stationarily mounted on said base opposite to said magnet and arranged substantially symmetrically with respect to said magnet, when an acceleration is not exerted thereon; and an electrical circuit for detecting the acceleration according to outputs from said magnetic sensors. The deformable member may be advantageously constituted by a cantilever having a first end rigidly secured to said base and a second or free end to which said permanent magnet is attached. Also, the magnetic sensor is preferably a barber-pole type magnetoresistive sensing element.

BRIEF DESCRIPTION OF THE DRAWINGS

FIG. 3 is a schematic view of a variation of the acceleration sensor shown in FIG. 2;

FIGS. 4A, 4B and 4C are schematic views of other variations of the acceleration sensor;

DESCRIPTION OF THE PREFERRED EMBODIMENTS

Figure 1:
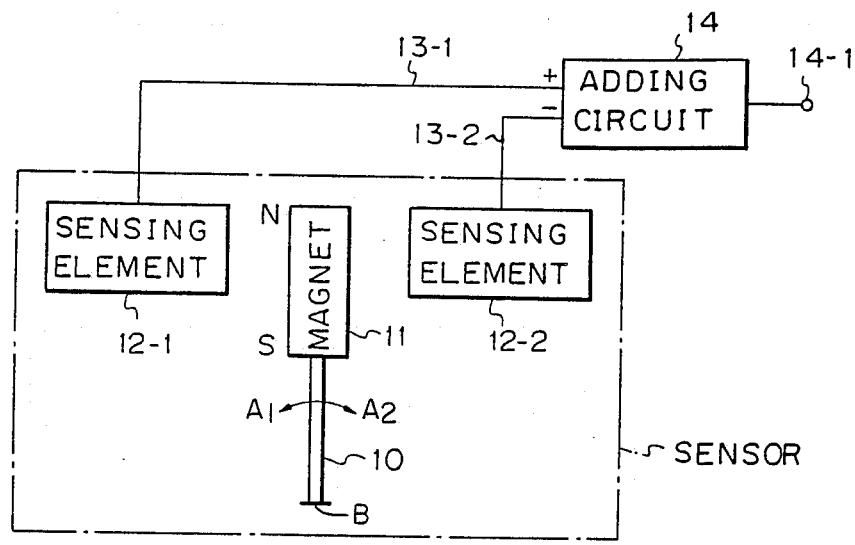
FIG. 1 is a schematical block diagram illustrating an acceleration sensor according to the present invention.

Referring now to FIG. 1, wherein an acceleration sensor of this invention essentially includes a beam 10 which is bent according to an acceleration exerted thereon, a permanent magnet 11 having N and S poles as shown, a pair of barber-pole type magnetoresistive sensing elements 12-1 and 12-2, output signal lines 13-1 and 13-2 of the elements 12-1 and 12-2, respectively, an adding circuit 14, and an output signal terminal 14-1.

For example, a cantilever beam 10 bendable by an acceleration has one end rigidly secured to a base 13 and the other end to which a permanent magnet 11 is attached. A pair of barber-pole type magnetoresistive sensing elements 12-1 and 12-2 are arranged at the respective sides of the permanent magnet 11 and symmetrically with respect to the beam 10. The output signals of these barber-pole elements 12-1 and 12-2 are input through the output signal lines 13-1 and 13-2 to an adding circuit 14 in which the outputs are added in reverse polarity so that an acceleration is determined in accordance with the output from the adding circuit 14.

In FIG. 1, assuming that m is a mass of the permanent magnet 11 attached to the bendable beam 10, G is an acceleration exerted on the permanent magnet 11, and x is a distance through which the permanent magnet 11 is moved, for example, toward the barber-pole element 12-2, then if k is a constant of proportion, the following representation is given:

G = kx/m

Consequently, assume that the beam 10 is bent as shown by arrow Az due to an acceleration exerted thereon and approaches the barber-pole element 12-2 from an initial position, in which the permanent magnet 11 is positioned when an acceleration is not exerted thereon. The displacement of the permanent magnet 11 can be read out from the change in electric signals representing the voltage change in the output line 13-2 of the magneto-resistive element 12-2, and thus a value of acceleration can be directly read out on the basis of this displacement. If an acceleration is exerted in the opposite direction, i.e., of arrow $A_1$, and the permanent magnet 11 approaches the magnetoresistive element 12-1, a value of acceleration can be determined in the same manner as above.

An operation to determine a value of acceleration can be also carried out in a same manner as above, even if a magnetoresistive element 12 is attached on one end of a beam 10 and a pair of magnets 11 are stationarily arranged at the respective, opposite sides of the element 12 and symmetrically with respect to the beam 10, or even if a magnetoresistive element 12 is attached-. on a middle portion of a bendable beam connected at the respective, opposite ends thereof to suitable base supports.

When the magnet 11 is moved by a certain distance due to an acceleration exerted thereon, from an initial position in which the above-mentioned pair of elements 12-1 and 12-2 are located symmetrically to each other relative to the magnet 11, the magnetoresistive elements 12-1 and 12-2 detect the distance independently. The outputs of the elements 12-1 and 12-2 are transmitted via the signal lines 13-1 and 13-2, respectively, to the adding circuit 14, in which the values are added in reverse opposite polarity to each other. Thus, an output obtained is at the adding circuit 14 which is twice the output of each of the respective elements 12-1 and 12-2.

Generally speaking, the magnetoresistive elements 12-1 and 12-2 are readily affected by a disturbance of a magnetic field, such as a geomagnetism. But, according to the present invention, such a disturbance is counterbalanced and the output signals are enhanced by a factor of two (2); in the adding circuit 14, so that a highly sensitive and practical acceleration sensor can be obtained by using barber-pole magnetoresistive sensing elements, which provide a linear output with respect to a magnetic field and can be arranged at preferred positions, since they do not need a bias magnetic field, as will be mentioned later.

Figure 2:
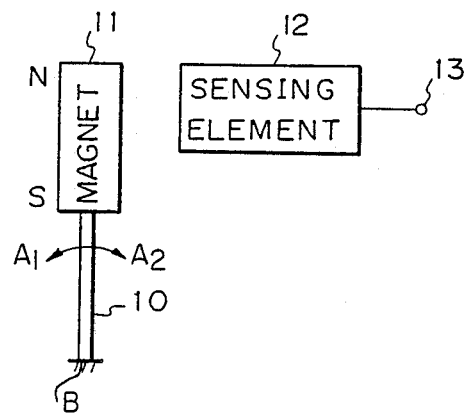
FIG. 2 is also a schematical block diagram of another acceleration sensor of this invention.

In FIG. 3, a coil spring 15 is used instead of the beam 10 and the magnet 11 is attached to a top end of the coil spring 15. The distance between the magnet 11 and a magnetoresistive sensing element 12 is changed by the coil spring 15 in the direction shown by an arrow 16, so that an acceleration can be detected in the same manner as in the previous embodiments shown in FIGS. 1 and 2.

FIG. 4A shows an embodiment including another beam 17 supported by the opposite ends thereof. In FIG. 4A, the ends of the beam 17 are fixedly connected to the bases B1 and B2 and a magnet 11 is mounted on a middle portion of the beam 17 so as to face a single magnetoresistive sensing element 12. When the magnet 11 is moved and a gap between the magnet 11 and the element 12 is increased or reduced, an acceleration can be detected in the same manner as the-above.

In FIG. 4B, respective, opposite ends of a beam 17 are fixedly connected to the bases B1 and B2 and two pairs of magnetoresistive sensing elements 12-1, 12-2, 12-3, and 13-4 are arranged at respective sides of the magnet 11 on respective lines perpendicular to each other. In general, if an acceleration is exerted in a direction parallel to a plane in which the element 12-1, magnet 11, and elements 12-2 exist, a value of acceleration can be obtained as changes in gaps between the magnet 11 and the elements 12-1 and 12-2. But, if an acceleration is exerted in a different direction, an accurate value of acceleration cannot be obtained from the output of the adding circuit 14-1 in which the outputs of only the elements 12-1 and 12-2 are added. To avoid this problem, this embodiment provides another pair of magnetoresistive sensing elements 12-3 and 12-4 so that another output is obtained in the adding circuit 14-2, in which the outputs of sensors 12-3 and 12-4 are added as vectors;- A beam 17 may be a cantilever or a beam supported by the respective ends thereof and may have a circular or rectangular crosssection.

In FIG. 4C, a coil spring 18 is fixedly connected to the base by respective ends thereof and a magnet 11 is mounted on a middle portion of the coil spring 18.

Figure 5:
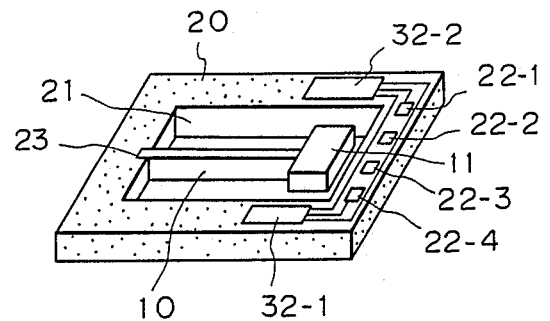
FIG. 5 is a perspective view illustrating in detail an embodiment of the acceleration sensor according to the present invention.

FIG. 5 shows in detail an embodiment of an acceleration sensor indicated by a dotted line in FIG. 1, in which a silicon substrate is used. This acceleration sensor comprises a silicon wafer 20 having an opening 21 provided therein, a beam 10, a permanent magnet 11, a pair of magnetoresistive sensing elements 32-1 and 32-2 used as transducers, and conductive pads 22-1 to 22-4 integrally formed with these elements 32-1 and 32-2 on the silicon wafer 20 for connecting these elements to an adding circuit (not shown). The beam 10 may be made of phosphorus bronze, and the permanent magnet 11 may be made of samarium cobalt having Br: 7000 gauss and- Hc: 7000 oerstead. The silicon substrate 20, at one side of the opening 21, has a recess 23 into which the beam 10 is fixedly inserted. The beam 10 has a larger thickness in the transverse direction than in the vertical direction in the drawing. The opening 21 and recess 23 can be accurately formed by, for example, an etching process.

Figure 6:
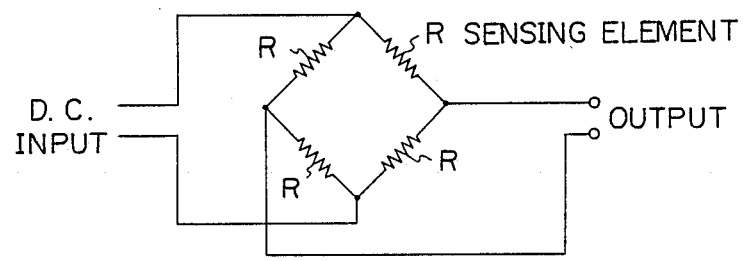
FIG. 6 is a block diagram of a circuit comprising magnetoresistive sensing elements.

The beam 10 can be bent in either direction toward the element 32-1 or 32-2 due to an acceleration exerted thereon in the horizontal direction. Each of the elements 32-1 and 32-2 may be constructed as a bridge consisting of four resistors R and formed on the silicon substrate 20, as shown in FIG. 6. Also, each of the elements 32-1 and 32-2 may be constructed in the shape of a barber-pole. In this case, a bias magnetic field is no longer necessary and a preferred output, i.e., a linear output with respect to the external magnetic field, can be obtained. Thus, an acceleration sensor having a stable performance with respect to a change of temperature may be obtained.

When the magnet 11 is moved toward or away from the magnetoresistive sensing elements 32-1 and 32-2, the output signals of these elements are changed and added in the adding circuit 14 (FIG. 1), in which a value of acceleration can be determined as mentioned above.

Both the beam 10 and magnet 11 shown in FIG. 5 may be made integrally as a single piece from, for example, a semirigid magnetic material.

Figure 7A:
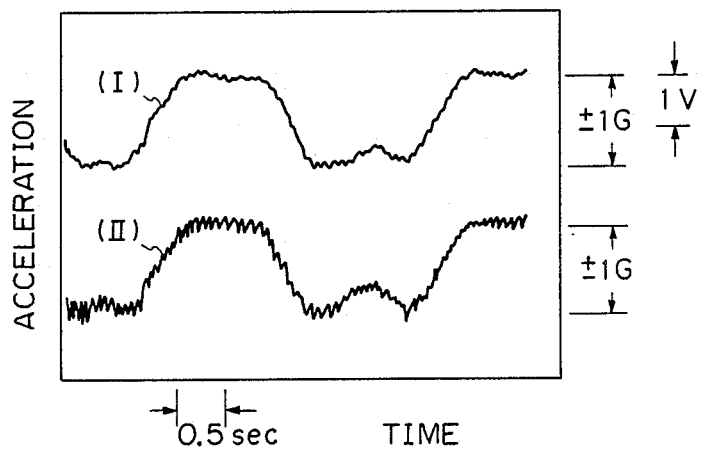
FIGS. 7a and 7B are diagrams showing the characteristics of the acceleration sensors.
Figure 7B:
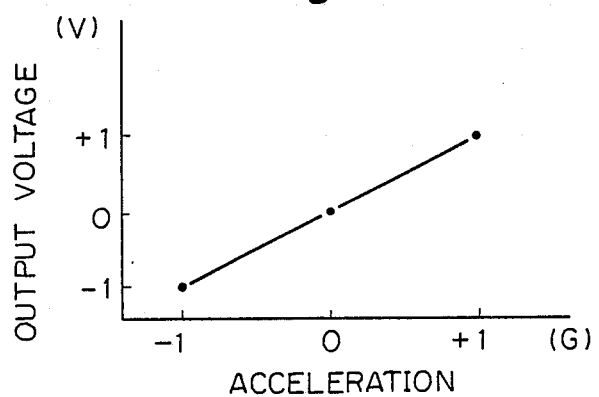

FIGS. 7A and 7B are diagrams showing outputs of the acceleration sensors. A wave curve (I) in FIG. 7A shows an output of a known acceleration sensor which is commercially available. A wave curve (II) in FIG. 7A shows an output of an acceleration sensor according to the embodiment of this invention as shown in FIG. 5. In both (I) and (II), the output voltage changes by about 1 volt with respect to a value of acceleration of +1G or −1G. It has been confirmed that the relationship between the value of acceleration G and the output voltage V has a substantially linear characteristic, as shown in FIG. 7B.

Figure 8:
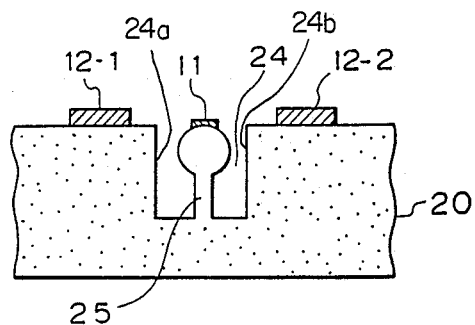
FIGS. 8 and 9 are partial cross-sectional views of the other embodiments of this invention.

FIG. 8 is a cross-sectional view taken along a vertical plane intersecting the magnetoresistive sensing elements 12-1 and 12-2 oriented as in FIG. 1, but in accordance with another embodiment thereof. In FIG. 8, a silicon substrate 20 is provided with a recess 24 and a vertical beam 25 is formed integrally with this silicon substrate 20. Magnetoresistive sensing elements 12-1 and 12-2 and a magnet 11 are arranged to be, in a common horizontal plane. Inner walls 24a and 24b of the recess 24 serve as stoppers, when or if the beam 25 is suddenly bent by abrupt shocks.

Figure 9:
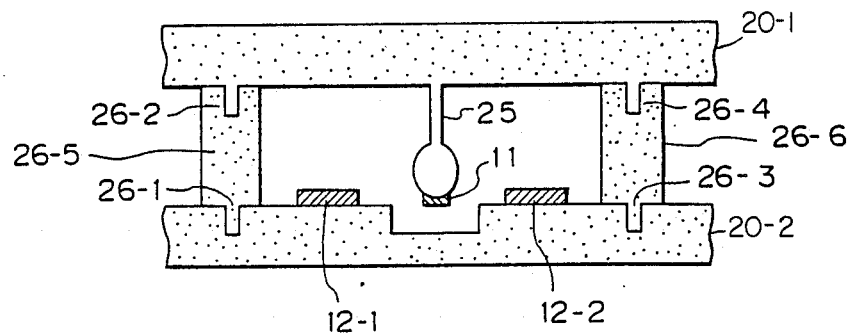

FIG. 9 is a cross-sectional view showing still another embodiments. In FIG. 9, a vertical beam 25' extends in an opposite direction relative to the embodiment of FIG. 8. The beam 25' may be made of silicon or any other material. In this case, in order to accurately position the magnetoresistive sensing elements 12-1 and 12-2 with respect to the magnet 11, the upper and lower silicon substrates 20-1 and 20-2 and spacers 26-5 and 26-6 are provided with projections and holes as shown at 26-1, 26-2, ...., and these projections are fitted into the holes to obtain a highly accurate acceleration sensor. The embodiment of FIG. 9 is advantageously applied to constitute an acceleration sensor as shown in FIG. 4B having two pairs of magnetoresistive sensing elements 12-1, 12-2, 12-3, and 12-4.

Figure 10:
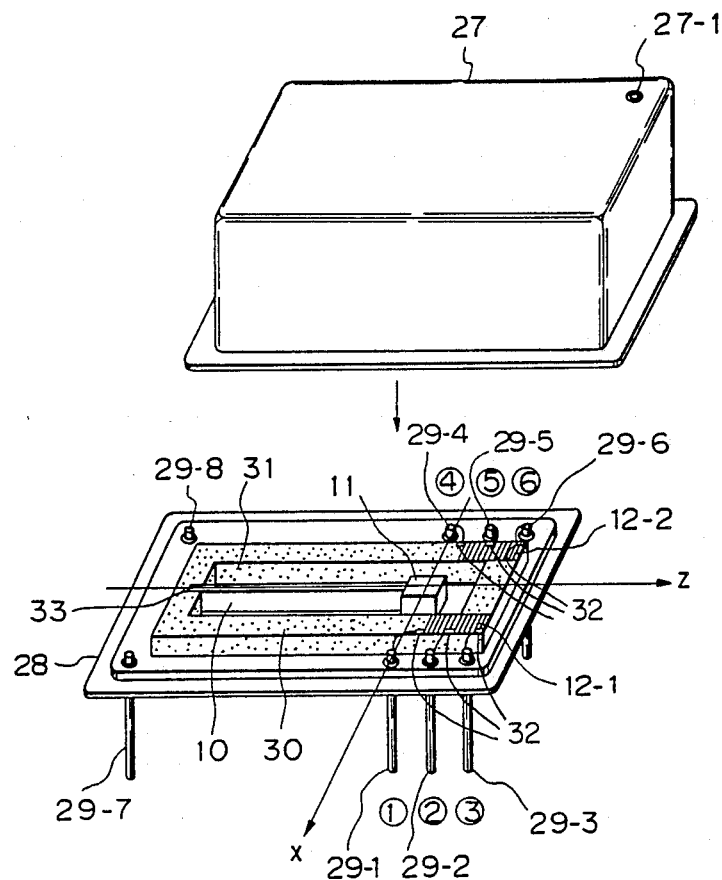
FIG. 10 is an exploded perspective view illustrating one embodiment of the acceleration sensor of this invention.

FIG. 10 is an exploded perspective view illustrating an embodiment of an acceleration sensor according to the present invention. A cap 27 and a base 28 cooperatively constituting a hermetic shield case are made of a magnetic material such as silicon steel, and the surfaces thereof are plated with nickel. The cap 27 has a sealing inlet 27-1 and the base 28 has external terminals 29-1 to 29-6 and other terminals 29-7 and 29-8, insulated from and fixed to this base 28.

After all elements and members for constituting the acceleration sensor are mounted on the base 28, the cap 27 is put on the base 28 and then the periphery of the cap 27 and base 28 are hermetically sealed together by, for example, welding, to form a magnetic shield case. Then, oil is filled into the case through the inlet 27-1 to prevent undesirable vibration and the inlet 27-1 is sealingly closed. An acceleration sensor according to the present invention is thus obtained, and such a sensor can be mounted on a printed circuit board.

The acceleration sensor shown in FIG. 10 has substantially the same construction as an embodiment shown in FIG. 5. Thus, a silicon substrate 30 has an opening 31 formed by an anisotropic etching and a cantilever beam 10 fixedly inserted into a recess 33. A permanent magnet 11 is attached to the beam 10 at one end thereof. A pair of barber-pole type magnetoresistive sensing elements 12-1 and 12-2 are arranged on the frame surfaces of the silicon substrate 30 which is fixed on the base 28 by an appropriate adhesive.

Figure 11:
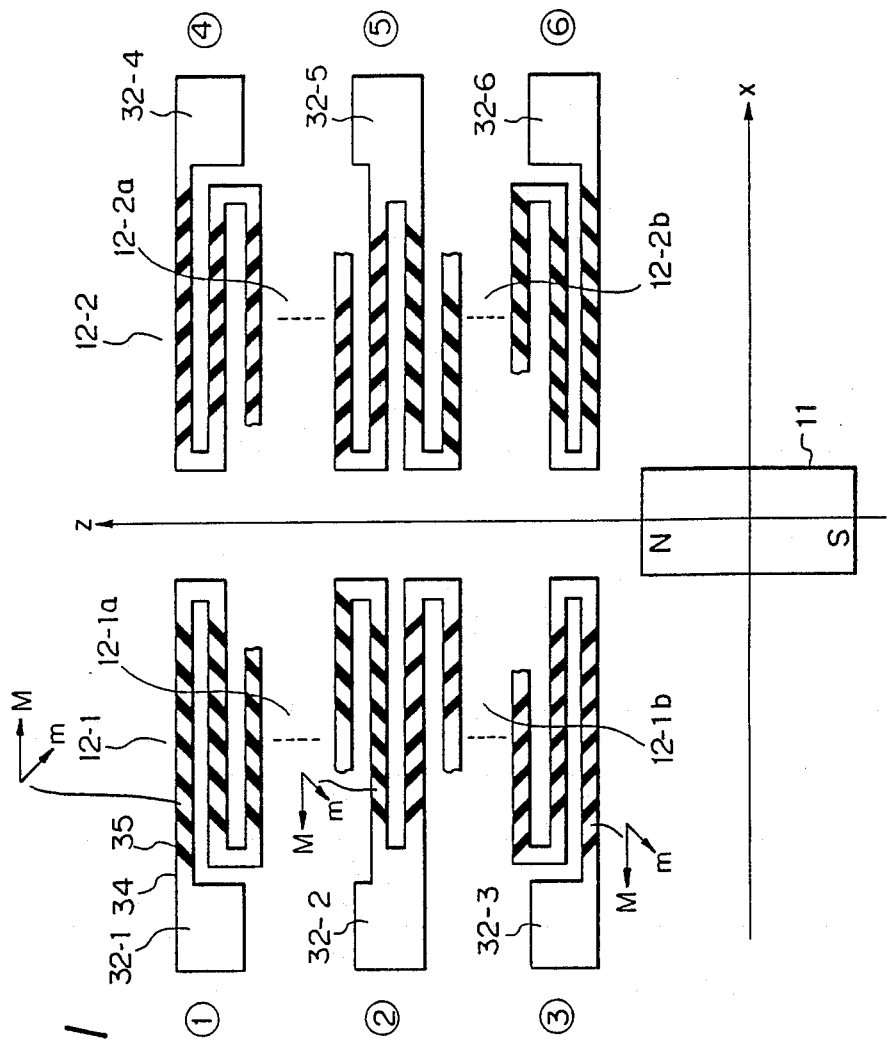
FIG. 11 is an enlarged plan view illustrating the magnetoresistive sensing elements used in the embodiment of FIG. 10.

As shown in FIG. 11, the magnetoresistive sensing elements 12-1 and 12-2 have respective, plural connecting pads 32, separately, numbered ① to ⑥, which are connected to the external terminals 29-1 to 29-6, respectively, via aluminum wires (as shown in FIG. 10) by a wire bonding process.

Each of the barber-pole type elements 12-1 and 12-2 is formed in practice as a pattern shown in FIG. 11, including a winding or zig-zag pattern of a magnetic thin film 34 made of, for example, permalloy (Ni-Fe alloy), and a plurality of conductive patterns 35 attached thereon and angularly inclined relatively thereto by, for example, 45°. The connecting pads 32-1 to 32-6 are formed as integral parts of these magnetic thin film patterns 34 and comprise longitudinally elongated portions parallel to the x-axis and perpendicular to the z-axis.

Each of the elements 12-1 and 12-2 includes resistive portions 12-1a and 12-1b, and 12-2a and 12-2b connected to each other in series and, thus, the barberpole type patterns are connected to each other to form a bridge in such a manner that the voltage changes of the magnetoresistive sensing elements 12-1 and 12-2 according to the external magnetic field are output in opposite polarity to each other and the voltage changes of the resistive portions 12-1a and 12-1b (and 12-2a and 12-2b) are output in opposite polarity to each other.

Figure 12:
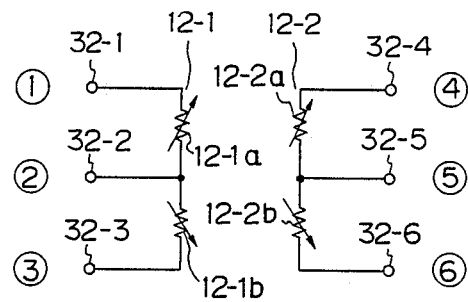
FIG. 12 is a view illustrating an equivalent circuit of the magnetoresistive sensing elements shown in FIG. 10.
Figure 13:
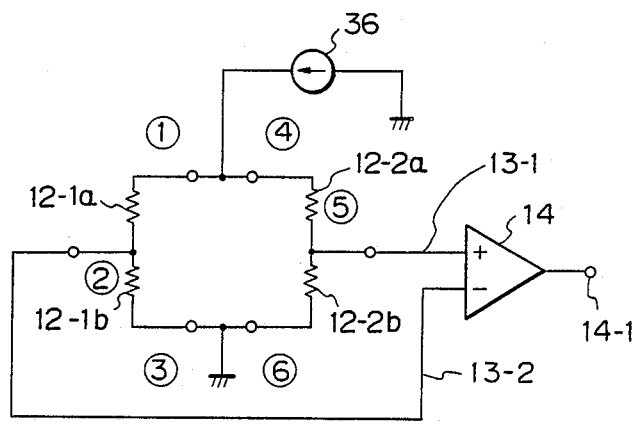
FIG. 13 is a diagram of a circuit constituting the acceleration sensor shown in FIG. 10.

FIG. 12 shows an equivalent circuit of the magnetoresistive sensing elements 12-1 (12-1a and 12-1b) and 12-2 (12-2a and 12-2b), in which the connecting pads 32-1 to 32-6 are used as terminals. Using the external terminals 29-1 to 29-6, these sensing elements are connected at the outside of the hermetic shield case to form a bridge as shown in FIG. 13, in which a D.C. power 36 is connected to the bridge to supply a constant current to the respective sensing elements, so that the output signals thereof are input to the adding circuit 14 having an output terminal 14-1 as shown in FIG. 1.

Figure 14:
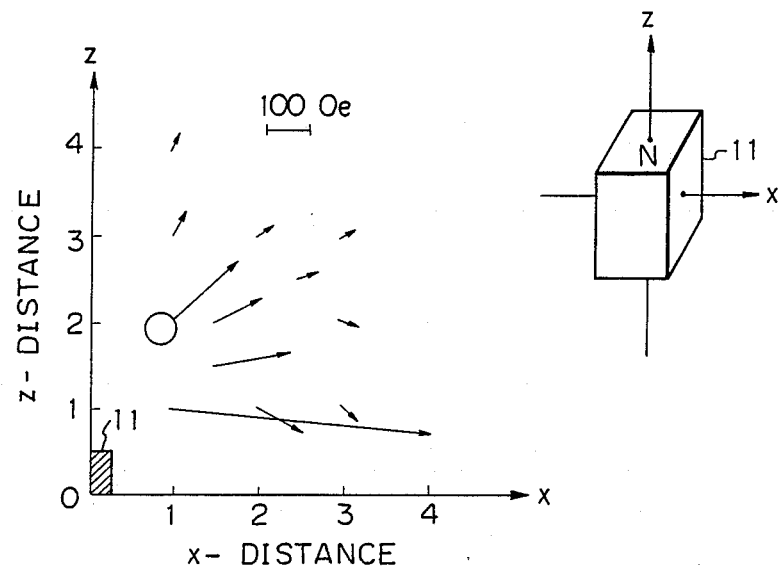
FIG. 14 is a schematic view illustrating the distribution of magnetic field of a magnet and the directions of the magnet.

FIG. 14 shows a magnetic field distribution and an orientation of the magnet 11, in which a simulated distribution is represented as shown on a plane of x and z-axes under a condition that a central point of the magnet 11 is located at an intersection of the x and z-axes. In this case, the magnet 11 made of samarium cobalt has Br: 7000 gauss and Hc: 7000 oerstead, as mentioned above. In FIG. 14, each arrow represents the orientation and strength of the magnetic field.

After confirming the magnetic field distribution of the magnet 11, the positions of the elements 12-1 and 12-2 with respect to the magnet 11 are determined, and thus, using this magnet 11 itself, a predetermined initial magnetism can be automatically given to each of the elements 12-1 and 12-2 without any particular bias magnetic field means.

In an example shown in FIG. 14, if the magnetoresistive sensing element 12-1 (or 12-2) having a thin film magnetic pattern 34 parallel to the x-axis is located at a point indicated by o, an initial magnetism of 150 oerstead can be given to the thin film magnetic pattern 34.

Figure 16:
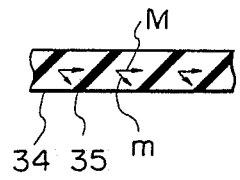
FIG. 16 is a partial plan view for explaining the initial magnetism in the magnetoresistive sensing elements of FIG. 10.

The initial magnetism is given in the longitudinal direction (x-axis) of the thin film magnetic pattern 34 as shown by arrows M in FIG. 16 and angled by 45° to the direction of current shown by arrows m between the conductive patterns 35.

Figure 15:
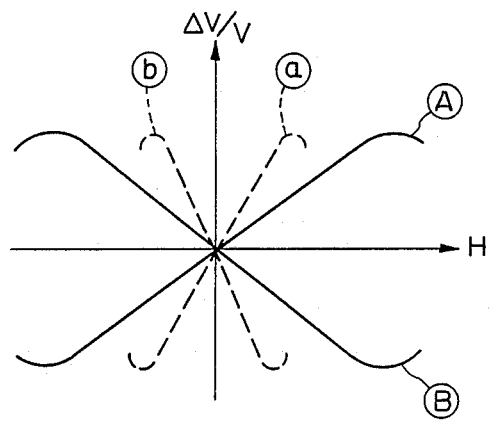
FIG. 15 is a diagram showing the output characteristics of the sensor shown in FIG. 10.

In a sensor shown in FIG. 10 having the thin film magnetic patterns 34 to which the above-mentioned initial magnetism is given, the output characteristics (i.e., changes of voltage ΔV/V with respect to the external magnetic field H by the magnet 11) of the magnetoresistive sensing elements 12-1 and 12-2 are represented as solid lines (A) and (B) in FIG. 15, from which it is clearly understood that the range of measurement can be significantly increased when compared with the output characteristics represented by dotted lines (a) and (b) when such an initial magnetism is not given.

Figure 17:
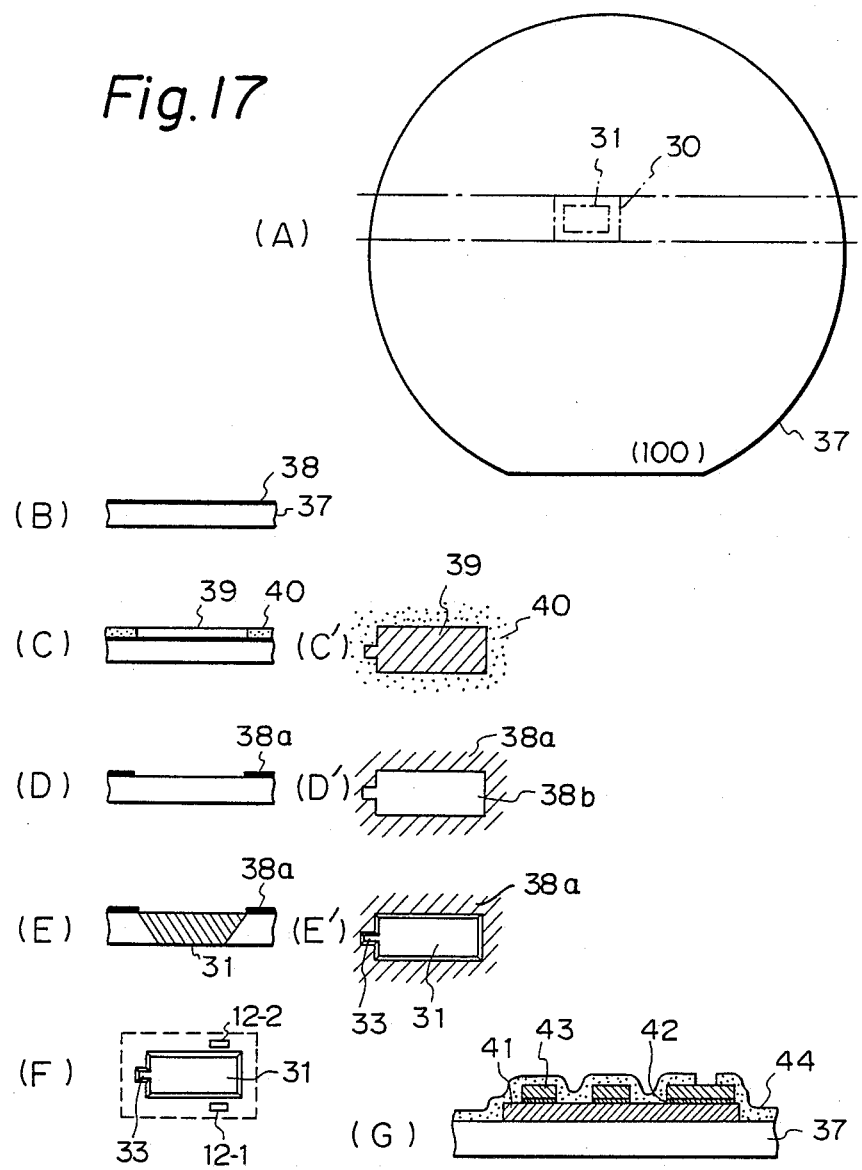
FIG. 17 is a schematic view for explaining, in series, a process for making an acceleration sensor according to the present invention.

FIG. 17 shows a process for making a sensor. A silicon wafer 37 having a face orientation of 100, as illustrated in (A), is formed with a plurality of holes 31, cut into a corresponding plurality of rectangular shaped silicon substrates 30.

In more detail, the surface of the silicon wafer 37 is coated with an oxide film 38 by heat oxidation as shown in (B) and then coated with a resist, which is then exposed with a light beam and developed to form a resist film 40 having a substantially rectangular opening 39 as shown in (C) and (C'). The oxide film 38 on the exposed opening 39 is then removed and the resist film 40 is also removed, to obtain a masking pattern 38a of the oxide film 38 having an opening 38b as shown in (D) and (D'). Then, a through opening 31 having a recess 33 is formed by anisotropically etching the portion of opening 38b as shown in (E) and (E'). In this case, if a mixed liquid of 255 cc of ethylenediamine, 120 cc of $H_2O$, and 45 g of cathecol is used at 100 to 110° C. as an etching liquid, the etching depth is 60 to 80 μm/hour and, therefore, such an opening 31 can be formed in about four hours, assuming that the thickness of the silicon wafer 37 is 280 μm.

Then, an oxide film is formed again over all of the front and rear surfaces of the silicon wafer 37 including the inner wall of the hole 31 and, subsequently, magnetoresistive sensing elements 12-1 and 12-2 are formed on the frame portions thereof as shown in (F). These elements 12-1 and 12-2 are formed as follows. As shown in (F), magnetic layers 41, film layers 42 consisting of Ta,Mo or the like, and conductive layers 43 are formed by evaporation on the oxide film of the silicon wafer 37. Then, thin film magnetic patterns 34 of the magnetic layers 41 and conductive patterns 35 of the conductive layers 43 are formed, respectively, by a patterning process, such as etching. Then, the surface of the wafer 37 is coated with a protective layer 44 consisting of $Si_3N_4$ or the like. Finally, the silicon wafer 37 is cut along a dotted line as shown in (F) to obtain a plurality of individually rectangular shaped silicon substrates 30.

Magnetoresistive sensing elements 12-1 and 12-2 may be made by another method separately from such a silicon wafer 37 and then rigidly adhered to the frame surfaces of the silicon wafer 37.

Figure 18:
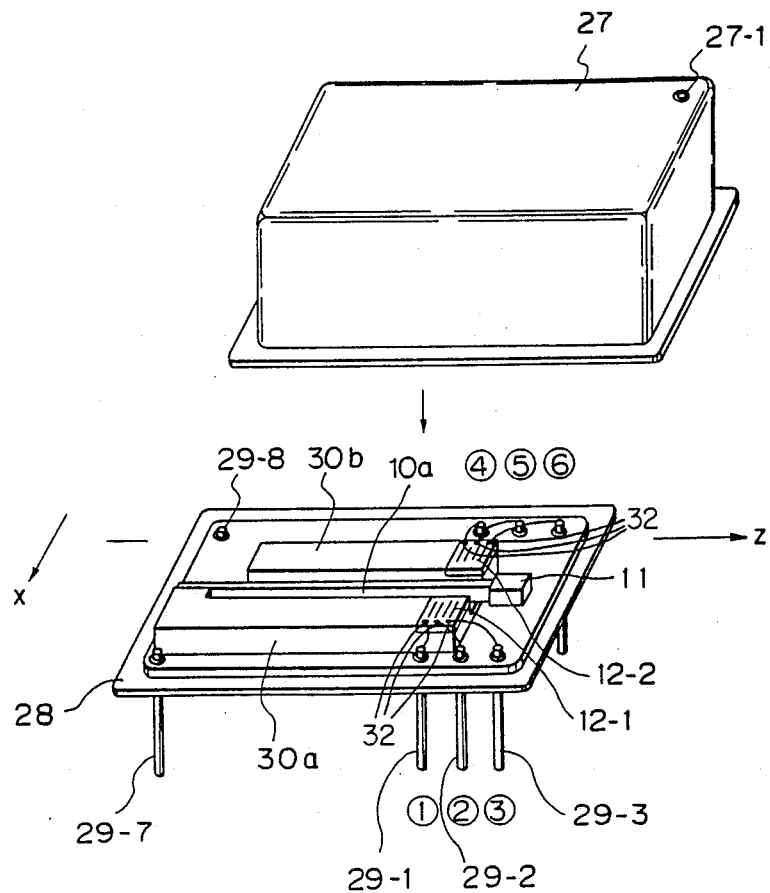
FIG. 18 is an exploded perspective view similar to FIG. 10, but illustrating another embodiment of this invention; and, FIG. 19 is a plan view, similar to FIG. 11, but illustrating another embodiment of the magnetoresistive sensing elements.

FIG. 18 is an exploded perspective view, similar to FIG. 10, but illustrating another embodiment of acceleration sensor according to the present invention. In this embodiment, the cap 27 having a sealing inlet 27-1 and the base 28 having terminals 29-1 to 29-8 are the same as those of the embodiment shown in FIG. 10.

In this embodiment, however, two support members 30a and 30b made of, for example, brass, are used instead of the silicon substrate 30. A cantilever beam 10 made of, for example, phosphoric bronze, has one end to which a permanent magnet 11 is attached and the other end which is fixedly supported on one end of the support member 30a. A pair of barber-pole type magnetoresistive sensing elements 12-1 and 12-2 are arranged on the support members 30a and 30b, respectively, which are fixed on the base 28 by an appropriate adhesive and serve as stoppers when the beam 10 is bent by abrupt shocks. These elements 12-1 and 12-2 have plural connecting pads 32, separately, numbered ① to ⑥, which are connected to the external 29-1 to 29-6, respectively, via aluminum bonding wires.

Figure 19:
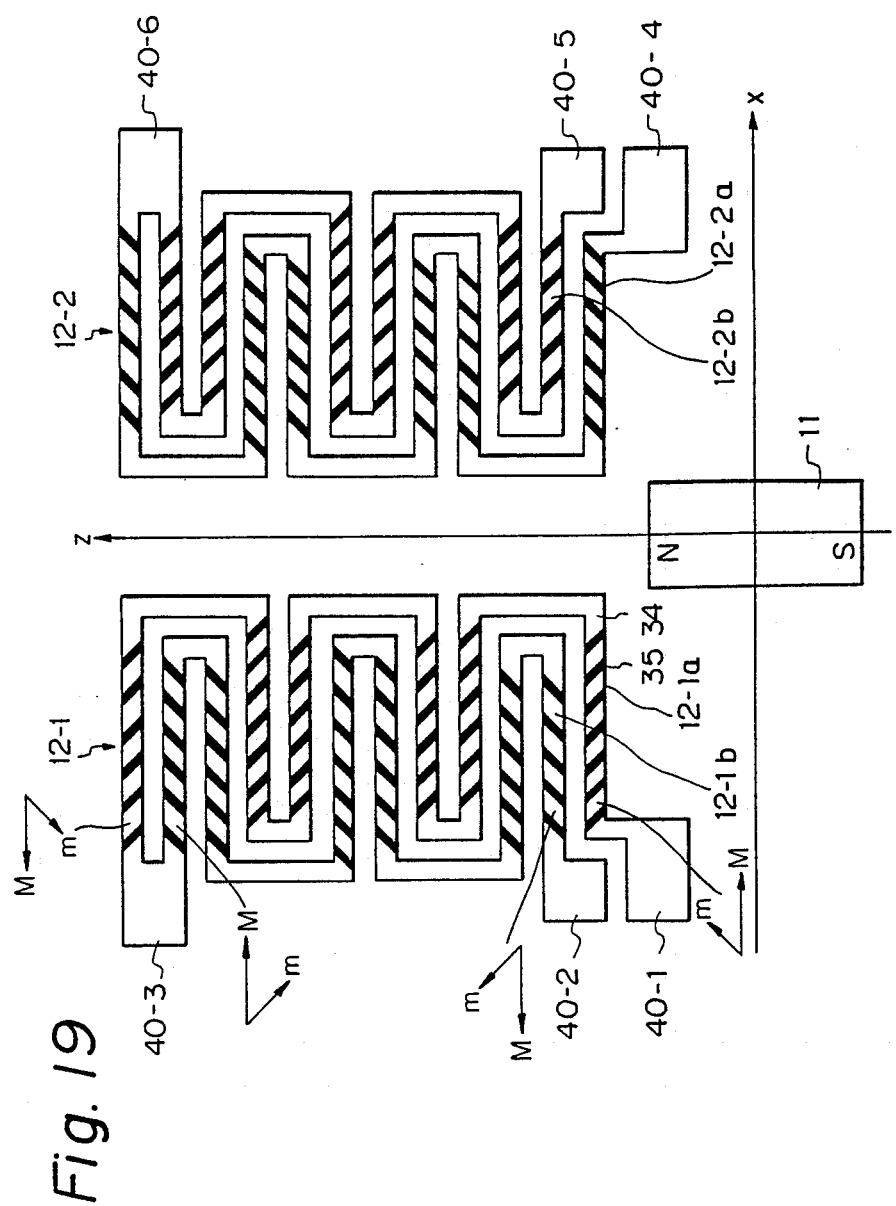

FIG. 19 is a view similar to FIG. 11, but illustrating another pattern of the barber-pole type magnetoresistive sensing elements 12-1 and 12-2, each of which consists of two winding or zig-zag patterns 12-1a and 12-1b (and 12-2a and 12-2b) made of magnetic thin films 34 of permalloy (Ni-Fe alloy) and extending substantially in parallel to each other. These patterns 12-1a and 12-1b have respective first ends defining input terminal pads 40-1 and 40-2 and other second ends connected to each other to form an a common output terminal pad 40-3. Similarly, the patterns 12-2a and 12-2b have respective input terminal pads 40-4 and 40-5 and a common output terminal pad 40-6.

A plurality of conductive stripe patterns 35, made of gold or the like, are formed on each of the magnetic thin films 34 so as to incline thereto by, for example, 45°. The respective conductive patterns 35 on the films 12-1a and 12-1b are, however, inclined in the opposite directions to each other, so that a bias current $i_1$ flowing through the conductive pattern 35 on the film 12-1a and a bias current $i_2$ flowing through the conductive pattern 35 on the film 12-1b are angled by, for example, 90°, as shown.

When predetermined bias currents $i_1$ and $i_2$ are flowed to these patterns 12-1a and 12-1b (12-2a and 12-2b) from the input terminals 40-1 and 40-2 (40-4 and 40-5), respectively, an external magnetic field Hex perpendicular to the longitudinal direction of these patterns 12-1a and 12-1b (12-2a and 12-2b) is amplified, so that a signal for accurately representing the external magnetic field Hex is output from the output terminal pad 40-3 (40-6). The remaining construction of this embodiment is the same or similar to that of the embodiment shown in FIG. 11.

We claim:

1. An acceleration sensor comprising:
a base;
a deformable beam comprising a first portion rigidly secured to the base and a second portion movable, by deformation of the beam in response to an acceleration force exerted thereon, from a predetermined initial position relative to the first portion to a second position displaced from the initial position by an amount proportional to the exerted acceleration force, and returnable to the initial position upon cessation of the acceleration force;
a permanent magnet attached to the second portion of the deformable beam for common movement therewith;
first and second magnetic sensors respectively comprising:
first and second zig-zag patterns of magnetic think film lying substantially in a common plane, each film pattern comprising a first plurality of spaced, parallel segments extending in a first direction and a second plurality of spaced, parallel segments extending in a second direction transverse to the first direction and respectively, integrally interconnecting the adjacent first segments at the opposite ends thereof in an alternating sequence in accordance with the zig-zag pattern;
the respective first segments of the first and second zig-zag patterns being in interdigitized and parallel, spaced relationship and with the respective, second segments thereof being in spaced and parallel, aligned relationship;
the first and second zig-zag patterns of magnetic thin films having respective, first ends defining corresponding input terminal pads and respective, second ends connected together to form a common output terminal pad;
first and second patterns of parallel, spaced line segments conductive material having a higher conductivity than that of the magnetic thin film, formed on the respective first and second zig-zag patterns of magnetic thin film, the first conductive pattern line segments being angularly inclined, relatively to the first plurality of parallel segments of the first zig-zag pattern, in a first sense, and the second conductive line segments being angularly inclined, relatively to the first plurality of parallel segments of the second, zig-zag pattern in a second, opposite sense, the first and second conductive material line segment patterns producing respective, first and second net bias current flow paths in the corresponding first and second magnetic thin film patterns which are angularly inclined with respect to each other;
the first and second magnetic sensors being fixedly mounted on the base at predetermined positions substantially symmetrically spaced from the magnet relative to the initial position of the deformable beam and with the common plane thereof parallel to the magnetic flux of the permanent magnet, the magnetic sensors producing respective outputs which are proportional to the extent of movement of the permanent magnet and correspondingly of the second portion of the deformable beam from the predetermined initial position thereof and thus to the acceleration force exerted thereon; and
an electrical circuit receiving the respective outputs of the magnetic sensors the producing an output indication of the acceleration force.

2. An acceleration sensor as set forth in claim 1, wherein said deformable beam comprises a cantilever having a first end corresponding to the first beam portion rigidly secured to said base and a second, free end corresponding to the second beam portion to which said permanent magnet is attached.

3. An acceleration sensor as set forth in claim 2, wherein said base comprises a silicon substrate having at least a first main surface, said first and second magnetic sensors being formed thereon in spaced relationship, the silicon substrate having an elongated opening extending therethrough transversely to the first main surface and having first and second, opposite ends, the second end of the opening extending between said first and second magnetic sensors, the cantilever being positioned within the opening, the first end thereof being rigidly secured to the silicon substrate base at the first end of the opening and the second, free end thereof being disposed adjacent the second end of the opening and, at the predetermined, initial position thereof, positioning the permanent magnet in spaced and substantially symmetrical relationship with respect to said first and second magnetic sensors.

4. An acceleration sensor as set forth in claim 1, wherein said first portion of said deformable beam comprises the respective opposite ends thereof, each opposite end being rigidly supported on the base, and the second portion comprises a central portion of the deformable beam, extending between the opposite end portions, and on which said permanent magnet is mounted.

5. An acceleration sensor as set forth in claim 1, wherein said base has at least two support members which serve as stoppers when said deformable beam is bent by abrupt shocks and prevent undesirable vibration.

6. An acceleration sensor as set forth in claim 1, further comprising a case formed of a magnetic shielding material and housing therewithin at least the base, the deformable beam, the permanent magnet, and the first and second magnetic sensors, the case being filled with oil and hermetically sealed so as to retain the oil therein.

7. An acceleration sensor as set forth in claim 6, wherein said case comprises a metal base portion and a metal cap portion which are hermetically sealed together.

8. An acceleration sensor as set forth in claim 7, wherein said case further comprises external electrical connection terminals extending through the metal base portion of the case in electrically insulated relationship therefrom, the terminals being connected to the magnetoresistive sensing elements within the case for transmitting the respective outputs thereof to the exterior of the case.

9. An acceleration sensor as recited in claim 1, wherein said base further comprises first and second support members symmetrically disposed at predetermined, spaced positions relative to the deformable beam at its predetermined initial position, the spacing thereof being selected to limit the extent of movement of the second portion of the beam and correspondingly of the deformation of the beam.

10. An acceleration sensor as set forth in claim 9, wherein the first and second magnetic sensors are mounted on the first and second support members respectively.

11. An acceleration sensor as recited in claim 1, wherein:
the first and second conductive segments are angularly inclined at approximately 45° and in respective, first and second opposite senses relatively to the respective first pluralities of parallel segments of the first and second zigzag patterns of magnetic think film and correspondingly at approximately 90° relatively to each other; and
the respective, net bias current flow paths in the first and second magnetic thin film zig-zag pattern are angularly inclined with respect to each other by approximately 90°.

12. An acceleration sensor comprising:
a base;
a deformable beam member having a first portion rigidly secured to said base and a second portion movable from a predetermined, initial position relative to the base in response to and by an extent proportional to an acceleration force exerted thereon and returnable to said initial position when an acceleration is not exerted thereon;
a permanent magnet affixed to said deformable beam at said second portion;
said deformable beam and said permanent magnet being formed integrally and of a semirigid magnetic material;
a pair of magnetic sensors, each comprising a magnetoresistive sensing element, fixedly mounted on said base opposite to said magnet and arranged substantially symmetrically with respect to said magnet in the absence of any acceleration force being exerted thereon and thus at the initial position thereof; and
an electrical circuit for detecting the acceleration according to outputs from said magnetic sensors.

13. An acceleration sensor as set forth in claim 12, further comprising a second pair of magnetic sensors, each sensor comprising a magnetoresistive sensing element having a main surface and a sensing film disposed on the main surface, the second pair of magnetic sensors being fixedly mounted on the base at predetermined positions substantially symmetrically disposed in opposed relationship to respective, opposite sides of said magnet relative to the initial position of the deformable beam and with the respective main surfaces, and correspondingly the sensing films, in a common plane extending parallel to the magnetic flux of the permanent magnetic and perpendicular to the common plane of the first pair of sensors; and
the electrical circuit receiving the respective outputs of the magnetic sensors of the first and second pairs thereof and producing an output indicating the value of the acceleration force.

* * * * *

UNITED STATES PATENT AND TRADEMARK OFFICE
CERTIFICATE OF CORRECTION

PATENT NO. : 4,967,598

DATED : November 6, 1990

INVENTOR(S) : WAKATSUKI et al.

It is certified that error appears in the above-identified patent and that said Letters Patent is hereby corrected as shown below:

Col. 2,      line 67, change "7a" to --7A--.

Col. 3,      line 42, change "13" to --B--;
line 51, after "polarity" insert --,--.

Col. 4,      line 16, delete "-.";
line 29, delete "reverse";
line 38, delete ";";
line 60, change "the-above" to --the above--;
line 64, change "13-4" to --12-4--;
line 68, change "elements" to --element--.

Col. 5,      line 11, change ";" to --.--;
line 29, change "and-" to --and--.

Col. 6,      line 13, change "embodiments" to --embodiment--.

Col. 8,      line 26, change "Ta,Mo" to --Ta, Mo--;
lines 34-35, change "individually" to --individual,--;
line 58, after "separately" delete ",".

Col. 9,      line 43, change "think" to --thin--.

UNITED STATES PATENT AND TRADEMARK OFFICE
CERTIFICATE OF CORRECTION

PATENT NO. : 4,967,598

DATED : November 6, 1990

INVENTOR(S) : WAKATSUKI et al.

It is certified that error appears in the above-identified patent and that said Letters Patent is hereby corrected as shown below:

Col. 11, line 32, change "think" to --thin--.

Col. 12, lines 33-34, change "magnetic" to --magnet--.

Signed and Sealed this

Thirteenth Day of July, 1993

Attest:

MICHAEL K. KIRK

Attesting Officer     Acting Commissioner of Patents and Trademarks